(12) United States Patent
Alles et al.

(10) Patent No.: US 8,160,609 B2
(45) Date of Patent: Apr. 17, 2012

(54) SYSTEM AND METHOD FOR MULTIPLE RANGE ESTIMATION LOCATION

(75) Inventors: Martin Alles, Dulles, VA (US); Khalid Al-Mufti, Sterling, VA (US); Ananth Kalenahalli, Fairfax, VA (US); Thomas B. Gravely, Herndon, VA (US)

(73) Assignee: Andrew LLC, Hickory, NC (US)

( * ) Notice: Subject to any disclaimer, the term of this patent is extended or adjusted under 35 U.S.C. 154(b) by 677 days.

(21) Appl. No.: 12/292,821

(22) Filed: Nov. 26, 2008

(65) Prior Publication Data

US 2010/0130225 A1 May 27, 2010

(51) Int. Cl.
*H04W 24/00* (2009.01)

(52) U.S. Cl. ............... 455/456.1; 455/456.2; 455/456.3; 455/456.4; 455/456.5; 455/456.6

(58) Field of Classification Search ..... 455/456.1–456.6
See application file for complete search history.

(56) References Cited

U.S. PATENT DOCUMENTS

| | | | |
|---|---|---|---|
| 3,150,372 A | 9/1964 | Groth, Jr. |
| 3,659,085 A | 4/1972 | Potter et al. |
| 4,814,751 A | 3/1989 | Hawkins |
| 4,845,504 A | 7/1989 | Roberts et al. |
| 4,891,650 A | 1/1990 | Sheffer |
| 5,056,106 A | 10/1991 | Wang |
| 5,218,618 A | 6/1993 | Sagey |
| 5,317,323 A | 5/1994 | Kennedy et al. |
| 5,327,144 A | 7/1994 | Stilp et al. |
| 5,365,544 A | 11/1994 | Schilling |
| 5,372,144 A | 12/1994 | Mortier et al. |
| 5,404,376 A | 4/1995 | Dent |
| 5,423,067 A | 6/1995 | Manabe |
| 5,465,289 A | 11/1995 | Kennedy |
| 5,506,863 A | 4/1996 | Meidan et al. |
| 5,506,864 A | 4/1996 | Schilling |
| 5,508,708 A | 4/1996 | Ghosh et al. |
| 5,512,908 A | 4/1996 | Herrick |
| 5,515,419 A | 5/1996 | Sheffer |
| 5,519,760 A | 5/1996 | Borkowski et al. |
| 5,559,864 A | 9/1996 | Kennedy |
| 5,592,180 A | 1/1997 | Yokev et al. |
| 5,608,410 A | 3/1997 | Stilp et al. |
| 5,614,914 A | 3/1997 | Bolgiano et al. |
| 5,675,344 A | 10/1997 | Tong et al. |
| 5,717,406 A | 2/1998 | Sanderford |

(Continued)

FOREIGN PATENT DOCUMENTS

EP 1755356 A1 2/2007

(Continued)

OTHER PUBLICATIONS

M.Silventionen and T.Rantalainen,. Mobile Station Emergency Locating in GSM, Proc. IEEE Int. Conf. Personal Wireless Communications, vol. 1 (1996), 232-238.

(Continued)

*Primary Examiner* — Nathan Mitchell
(74) *Attorney, Agent, or Firm* — Duane Morris LLP

(57) ABSTRACT

A system and method of determining the location of a mobile station by determining the time of transmission of a signal by a mobile station and determining range rings at a plurality of reference stations receiving the transmitted signal, where the range rings represent the distance f the mobile station from the plurality of reference stations.

34 Claims, 2 Drawing Sheets

U.S. PATENT DOCUMENTS

| | | |
|---|---|---|
| 5,736,964 A | 4/1998 | Ghosh et al. |
| 5,815,538 A | 9/1998 | Grell et al. |
| 5,825,887 A | 10/1998 | Lennen |
| 5,870,029 A | 2/1999 | Otto et al. |
| 5,920,278 A | 7/1999 | Tyler et al. |
| 5,952,969 A | 9/1999 | Hagerman et al. |
| 5,959,580 A | 9/1999 | Maloney et al. |
| 5,960,341 A | 9/1999 | LeBlanc et al. |
| 5,973,643 A | 10/1999 | Hawkes et al. |
| 5,987,329 A * | 11/1999 | Yost et al. ................. 455/456.1 |
| 6,009,334 A | 12/1999 | Grubeck et al. |
| 6,011,974 A | 1/2000 | Cedervall |
| 6,014,102 A | 1/2000 | Mitzlaff et al. |
| 6,031,490 A | 2/2000 | Forssen et al. |
| 6,040,800 A | 3/2000 | Raith et al. |
| 6,047,192 A | 4/2000 | Maloney |
| 6,064,888 A | 5/2000 | Lundqvist et al. |
| 6,091,362 A | 7/2000 | Stilp |
| 6,097,336 A | 8/2000 | Stilp |
| 6,097,959 A | 8/2000 | Yost |
| 6,101,178 A | 8/2000 | Beal |
| 6,108,555 A | 8/2000 | Maloney et al. |
| 6,115,599 A | 9/2000 | Stilp |
| 6,119,013 A | 9/2000 | Maloney et al. |
| 6,127,975 A | 10/2000 | Maloney |
| 6,134,228 A | 10/2000 | Cedervall |
| 6,144,711 A | 11/2000 | Raleigh et al. |
| 6,172,644 B1 | 1/2001 | Stilp |
| 6,184,829 B1 | 2/2001 | Stilp |
| 6,188,351 B1 | 2/2001 | Bloebaum |
| 6,191,738 B1 | 2/2001 | Pfeil et al. |
| 6,201,499 B1 | 3/2001 | Hawkes et al. |
| 6,201,803 B1 | 3/2001 | Munday et al. |
| 6,212,319 B1 | 4/2001 | Cayrefourcq |
| 6,219,557 B1 | 4/2001 | Havinis |
| 6,233,459 B1 | 5/2001 | Sullivan et al. |
| 6,246,884 B1 | 6/2001 | Karmi et al. |
| 6,252,543 B1* | 6/2001 | Camp ....................... 342/357.29 |
| 6,266,013 B1 | 7/2001 | Stilp et al. |
| 6,281,834 B1 | 8/2001 | Stilp |
| 6,285,321 B1 | 9/2001 | Stilp et al. |
| 6,288,675 B1 | 9/2001 | Maloney |
| 6,288,676 B1 | 9/2001 | Maloney |
| 6,295,455 B1 | 9/2001 | Fischer et al. |
| 6,311,043 B1 | 10/2001 | Haardt et al. |
| 6,317,081 B1 | 11/2001 | Stilp |
| 6,317,604 B1 | 11/2001 | Kovach, Jr. et al. |
| 6,334,059 B1 | 12/2001 | Stilp et al. |
| 6,351,235 B1 | 2/2002 | Stilp |
| 6,353,744 B1 | 3/2002 | Wu et al. |
| 6,356,763 B1 | 3/2002 | Kangas et al. |
| 6,366,241 B2 | 4/2002 | Pack |
| 6,388,618 B1 | 5/2002 | Stilp et al. |
| 6,400,320 B1 | 6/2002 | Stilp et al. |
| 6,407,703 B1 | 6/2002 | Minter et al. |
| 6,463,290 B1 | 10/2002 | Stilp et al. |
| 6,470,185 B2 | 10/2002 | Kangas et al. |
| 6,470,195 B1 | 10/2002 | Meyer |
| 6,477,161 B1 | 11/2002 | Hudson |
| 6,483,460 B2 | 11/2002 | Stilp et al. |
| 6,492,944 B1 | 12/2002 | Stilp |
| 6,501,955 B1 | 12/2002 | Durrant et al. |
| 6,519,465 B2 | 2/2003 | Stilp et al. |
| 6,522,887 B2 | 2/2003 | Larsson et al. |
| 6,526,267 B1* | 2/2003 | Jokimies et al. .......... 455/161.1 |
| 6,526,283 B1 | 2/2003 | Jang |
| 6,529,708 B1 | 3/2003 | Larsson et al. |
| 6,546,256 B1 | 4/2003 | Maloney |
| 6,553,322 B1 | 4/2003 | Ignagni |
| 6,563,460 B2 | 5/2003 | Stilp et al. |
| 6,571,082 B1 | 5/2003 | Rahman |
| 6,603,428 B2 | 8/2003 | Stilp |
| 6,603,761 B1 | 8/2003 | Wang et al. |
| 6,633,559 B1 | 10/2003 | Asokan |
| 6,640,106 B2 | 10/2003 | Gutowski et al. |
| 6,646,604 B2 | 11/2003 | Anderson |
| 6,661,379 B2 | 12/2003 | Stilp et al. |
| 6,671,514 B1 | 12/2003 | Cedervall |
| 6,675,018 B2 | 1/2004 | Villier et al. |
| 6,765,531 B2 | 7/2004 | Anderson |
| 6,771,625 B1 | 8/2004 | Beal |
| 6,771,969 B1 | 8/2004 | Chinoy |
| 6,782,264 B2 | 8/2004 | Anderson |
| 6,834,234 B2 | 12/2004 | Scherzinger et al. |
| 6,839,539 B2 | 1/2005 | Durrant et al. |
| 6,845,240 B2 | 1/2005 | Carlson et al. |
| 6,859,172 B2 | 2/2005 | Powers et al. |
| 6,865,394 B2 | 3/2005 | Ogino et al. |
| 6,871,077 B2 | 3/2005 | Kennedy, Jr. |
| 6,873,290 B2 | 3/2005 | Anderson et al. |
| 6,876,859 B2 | 4/2005 | Anderson et al. |
| 6,920,329 B2 | 7/2005 | Kennedy, Jr. et al. |
| 6,922,170 B2 | 7/2005 | Alexander, Jr. |
| 6,937,865 B1 | 8/2005 | Bloebaum |
| 6,950,664 B2 | 9/2005 | Chen |
| 6,952,158 B2 | 10/2005 | Kennedy, Jr. |
| 6,968,194 B2 | 11/2005 | Aljadeff |
| 6,973,320 B2 | 12/2005 | Brown et al. |
| 6,987,979 B2 | 1/2006 | Carlsson |
| 6,996,392 B2 | 2/2006 | Anderson |
| 7,023,383 B2 | 4/2006 | Stilp et al. |
| 7,065,368 B2 | 6/2006 | You et al. |
| 7,133,647 B2 | 11/2006 | Dent |
| 7,155,237 B2 | 12/2006 | Porcino |
| 7,167,713 B2 | 1/2007 | Anderson |
| 7,203,499 B2 | 4/2007 | Wigren |
| 7,224,986 B2 | 5/2007 | Nikolai et al. |
| 7,236,879 B2 | 6/2007 | Tsunehara |
| 7,271,765 B2 | 9/2007 | Stilp et al. |
| 7,340,259 B2 | 3/2008 | Maloney |
| 7,353,031 B2 | 4/2008 | Shi et al. |
| 7,363,044 B2 | 4/2008 | Korneluk et al. |
| 7,427,952 B2 | 9/2008 | Bull et al. |
| 7,440,762 B2 | 10/2008 | Maloney et al. |
| 7,486,233 B2 | 2/2009 | Stenberg et al. |
| 7,593,738 B2 | 9/2009 | Anderson |
| 2002/0172223 A1 | 11/2002 | Stilp et al. |
| 2002/0183073 A1* | 12/2002 | Morgand et al. ............. 455/456 |
| 2003/0064734 A1 | 4/2003 | Stilp et al. |
| 2003/0069024 A1* | 4/2003 | Kennedy, Jr. ................ 455/456 |
| 2003/0139188 A1* | 7/2003 | Chen et al. .................. 455/456 |
| 2003/0190919 A1 | 10/2003 | Niemenmaa |
| 2003/0203738 A1* | 10/2003 | Brown et al. ............. 455/456.1 |
| 2004/0043775 A1 | 3/2004 | Kennedy, Jr. et al. |
| 2004/0132466 A1 | 7/2004 | Kennedy, Jr. et al. |
| 2004/0203921 A1* | 10/2004 | Bromhead et al. ........ 455/456.1 |
| 2004/0218664 A1 | 11/2004 | Kennedy, Jr. et al. |
| 2004/0252752 A1 | 12/2004 | Kennedy, Jr. et al. |
| 2005/0058182 A1 | 3/2005 | Kennedy, Jr. et al. |
| 2005/0136945 A1 | 6/2005 | Kennedy, Jr. et al. |
| 2005/0148346 A1 | 7/2005 | Maloney et al. |
| 2005/0164712 A1 | 7/2005 | Kennedy, Jr. et al. |
| 2005/0192026 A1 | 9/2005 | Carlson et al. |
| 2006/0003695 A1 | 1/2006 | Kennedy, Jr. et al. |
| 2006/0017611 A1 | 1/2006 | Hatch et al. |
| 2006/0030333 A1* | 2/2006 | Ward et al. ............... 455/456.1 |
| 2006/0116130 A1 | 6/2006 | Kennedy, Jr. et al. |
| 2006/0125695 A1 | 6/2006 | Kennedy, Jr. et al. |
| 2006/0141998 A1 | 6/2006 | Kennedy, Jr. et al. |
| 2006/0154607 A1 | 7/2006 | Kennedy, Jr. et al. |
| 2006/0240836 A1 | 10/2006 | Kennedy, Jr. et al. |
| 2007/0040744 A1 | 2/2007 | Zimmerman et al. |
| 2007/0087689 A1 | 4/2007 | Kennedy, Jr. et al. |
| 2007/0111746 A1 | 5/2007 | Anderson et al. |
| 2007/0129085 A1* | 6/2007 | Kennedy, Jr. ............. 455/456.2 |
| 2007/0149214 A1* | 6/2007 | Walsh et al. .............. 455/456.1 |
| 2007/0155401 A1 | 7/2007 | Ward et al. |
| 2007/0155489 A1 | 7/2007 | Beckley et al. |
| 2007/0202885 A1 | 8/2007 | Kennedy, Jr. et al. |
| 2007/0229350 A1 | 10/2007 | Scalisi et al. |
| 2007/0254673 A1* | 11/2007 | Stenberg et al. .......... 455/456.1 |
| 2007/0287473 A1* | 12/2007 | Dupray ..................... 455/456.1 |
| 2008/0132244 A1 | 6/2008 | Anderson et al. |
| 2008/0132247 A1 | 6/2008 | Anderson et al. |
| 2008/0137524 A1 | 6/2008 | Anderson et al. |
| 2008/0158059 A1 | 7/2008 | Bull et al. |
| 2008/0160952 A1 | 7/2008 | Bull et al. |

| | | | |
|---|---|---|---|
| 2008/0160953 | A1 | 7/2008 | Mia et al. |
| 2008/0161015 | A1 | 7/2008 | Maloney et al. |
| 2008/0234930 | A1 | 9/2008 | Cheok et al. |
| 2008/0248811 | A1 | 10/2008 | Maloney et al. |
| 2008/0261611 | A1 | 10/2008 | Mia et al. |
| 2008/0261612 | A1 | 10/2008 | Mia et al. |
| 2008/0261613 | A1 | 10/2008 | Anderson et al. |
| 2008/0261614 | A1 | 10/2008 | Mia et al. |
| 2009/0005061 | A1 | 1/2009 | Ward et al. |

FOREIGN PATENT DOCUMENTS

| | | |
|---|---|---|
| JP | 60-347529 | 12/1994 |
| WO | 97/27711 A1 | 7/1997 |
| WO | 9909778 A1 | 2/1999 |
| WO | 0154422 A2 | 7/2001 |
| WO | 03098957 A1 | 11/2003 |
| WO | 2006088472 A1 | 8/2006 |
| WO | 2007013850 A2 | 2/2007 |

OTHER PUBLICATIONS

P.-C.Chen. A non-line-of-sight error mitigation algorithm in location estimation, Proc. IEEE Conf. on Wireless Communications Networking, vol. 1 (1999), 316-320.

Xin Wang, Zongxin Wang and Bob O'Dea. A TOA-based Location Algorithm Reducing the Errors due to Non-Line-Of-Sight (NLOS) Propagation, IEEE Trans. Vehicular Technology., vol. 52, No. 1 (Jan. 2003), 112-116.

Y. Zhao, "Standardization of Mobile Phone Positioning for 3G Systems," IEEE Communications Magazine, Jul. 2002, pp. 108-116.

C. Drane, "Positioning GSM Telephones," IEEE Communications Magazine, Apr. 1998, pp. 46-59.

J. Caffrery, Jr. et al., "Overview of Radiolocation in CDMA Cellular Systems," IEEE Communications Magazine, Apr. 1998, pp. 38-45.

T. Rappaport et al. "Position Location Using Wireless Communications on Highways of the Future," IEEE Communications Magazine, Oct. 1996, pp. 33-41.

Han Ziskind and Mati Wax, "Maximum likelihood localization of multiple sources by alternatingprojection," IEEE Trans. ASSP, vol. 36, No. 10, pp. 1553-1560, Oct. 1988.

W.K. Colman, "A Comparison of the Accuracy of TDOA and TOA Location Algorithms with Equivalent Receiver Geometry," Defence R&D Canada Technical Memorandum (DREO TM 2001-063), Oct. 2001.

L.Mailaender, "On the Geolcation Bounds for Round-Trip Time-of-Arrival and All Nonline-of-sight Channels", EURASIP Journal on Advances in Signal Processing, vol. 2008.

Nilesh Agarwal Leena Chandran-Wadi a Varsha Apte, "Capacity Analysis of the GSM Short Message Service," Indian Institute of Technology Bombay, www.cse.iitb.ac.inl-varshaiallpapers/wireless/ncc03cam.pdf, 2003.

John D. Bard and Fredric M. Ham,"Time Difference of Arrival Dilution of Precision and Applications," IEEE Transactions on Signal Processing, vol. 47, No. 2, p. 521-3, Feb. 1999.

K. C. Ho, and Wenwei Xu, "An Accurate Algebraic Solution for Moving Source Location Using TDOA and FDOA Measurements", IEEE Transactions on Signal Processing, vol. 52, No. 9, Sep. 2004.

Charles H. Knapp and G. Clifford Carter, "The generalized correlation method for estimation of time delay," IEEE Trans. ASSP, vol. ASSP-24 No. 4, pp. 320-327, Aug. 1976.

Rahnema, Moe, "Overview of a GSM System and Protocol Architecture," IEEE Communications Magazine, Apr. 1993.

Seymour Stein, "Algorithms for Ambiguity function processing," IEEE Trans. ASSP, vol. ASSP-28, No. 3, pp. 588-599 Jun. 1981.

Michaela C. Vanderveen, et. al., "Joint Angle and Delay Estimation (JADE) for Multipath Signals Arriving at an Antenna Array,"IEEE Communications Letters, vol. 1, No. 1, pp. 12-14, Jan. 1997.

Mati Wax and Han Ziskind, "On unique localization of multiple sources by passive sensor arrays," IEEE Trans. ASSP, vol. 37 No. 7, pp. 996-1000, Jul. 1989.

Bin Yang, "Projection approximation subspace tracking," IEEE Trans SP, vol. 43 No. 1, pp. 95-107, Jan. 1995.

International Searching Authority, International Search Report in corresponding International Application Ser. No. PCT/US09/65035, mailed Jan. 27, 2010, p. 1-2.

International Searching Authority, Written Opinion of the International Searching Authority in corresponding International Application Ser. No. PCT/US09/65035, mailed Jan. 27, 2010, p. 1-10.

Paulraj, A.J., Papadias, C.B., "Space-Time Signal Processing for Wireless Communications: A Survey" Information System Laboratory, Stanford University.

Leshem, et al., "Array Calibration in the Presence of Multipath," IEEE Transactions of Signal Processing, vol. 48, No. 1, pp. 53-59, Jan. 1, 2000.

Ziskind, I., Wax, M., "Maximum likelihood localization of multiple sources by alternating projection", IEEE Trans. Acoust., Speech, Signal Process. vol. 36, No. 2 (Oct. 1988), 1553-1560.

Van Der Veen, M, Papadias, C.B., Paulraj, A.J., "Joint angle and delay estimation" IEEE Communications Letters vol. 1-1 (Jan. 1997), 12-14.

Schmidt, R.O. "Multiple emitter location and signal parameter estimation" Proc. RADC Spectrum Estimation Workshop, (Mar. 1999), 243-258.

Young-Fang Chen, Michael D. Zoltowski "Joint Angle and Delay estimation of DS-CDMA communication systems with Application to Reduced Dimension Space-time 2D Rake Receivers", IEEE Transactions on Signal Processing, Mar. 1999.

Paulraj, A.J., Papadias, C.B., "Space-Time Signal Processing for Wireless Communications", IEEE Signal Processing Magazine, vol. 11 (Nov. 1997), 49-83.

Paulraj, A.J., Papadias, C.B., "Space-Time Signal Processing for Wireless Communications: A Survey" Information System Laboratory, Stanford University, Nov. 1997.

Haardt, Brunner and Nossek Joint Estimation of 2-D Arrival Angles, Propagation Delays, and Doppler Frequencies in Wireless Communications, Proc. IEEE Digital Signal Processing Workshop, vol. 1, pp. 1-4, Bryce Canyon National Park, Utah, Aug. 1998.

M.Wax, "Position location from sensors with position uncertainty", IEEE Trans. Aero., Elect. Syst. AES-19, No. 2 (Sep. 1983), 658-662.

D.J. Torrieri. "Statistical Theory of Passive Location Systems", IEEE Trans. Aerosp. Electron. Syst. AES-20, No. 2 (Mar. 1984), 183-198.

Y.T. Chan and K.C. Ho, "A simple and efficient estimator for hyperbolic location", IEEE Trans. Signal Proc. 42, No. 8 (Aug. 1994), 1905-1915.

W.H. Foy. "Position location solutions by Taylor series estimation", IEEE trans Aerosp. Electron. System AES-12, No. 2 (Mar. 1976), 187-194.

R.G. Stansfield, "Statistical theory of DF fixing", Journ. IEE 94, part IIIa (Oct. 1947), 762-770.

M.P. Wylie and J. Houtzman, "The non-line of sight problem in mobile location estimation". Proc. IEEE 5thlinternational Conf. on Universal Personal Communications, vol. 2 (Oct. 1996), 827-831.

L.Cong and W.Xuang, "Non-Line-of-Sight Error Mitigation in TDOA mobile location" Proc. IEEE Global Telecommunications conference vol. 1 (2001), 680-684.

Caffery, J., Jr., "A New Approach to the Geometry of TOA Location," IEEE, VTC 2000, pp. 1943-1949.

N.J. Thomas, D.G.M. Cruickshank and D.I.Laurenson, "Performance of a TDOA-AOA hybrid mobile location system" 3G Mobile Communication Technologies Conf. Proc. 1 (Mar. 2001), 216-220.

Caffery, J., Jr., et al., "Subscriber Location in CDMA Cellular Networks," IEEE Transactions on Vehicular Technology, vol. 47, No. 2, May 1998.

* cited by examiner

SYSTEM AND METHOD FOR MULTIPLE RANGE ESTIMATION LOCATION

The present disclosure is directed to an accurate location estimation of a mobile device. More specifically the present disclosure is directed at estimating the location of a mobile device using multiple range estimates.

BACKGROUND

It is well known to determine the location of a mobile device based on signals that are transmitted by the mobile device received at a plurality of reference stations. When a location estimation technique is dependent on signal arrival time or signal transit time measurements, it is well recognized that signal multipath is often highly deleterious to the accuracy of the location estimate. Multipath refers to the reflection of a signal, or component of a signal off an object between the transmitter and the receiver.

In the context of a wireless network, a mobile device or mobile station (MS) transmits uplink signals to an access point or base station (BS) that may have a certain functional relationship (in terms of signal timing) with respect to downlink signals transmitted by a serving access point. This functional relationship permits an extraneous system to observe the transmissions between the mobile devices and the access point, and by doing so, determine the time of transmission for a given signal from the mobile device.

Knowing the time of transmission of a signal from a mobile device, and the time at which this same signal is received at a set of other observing stations (termed Wireless Location Sensors or WLSs), it is possible to obtain a set of Range Rings (RRs) representing the distance of the mobile device to each WLS. The intersection of the RRs represents the estimated geographic location of the mobile device.

However, in most location systems, the WLSs do not know the time of transmission of the signals from the mobile device. This is especially so when the mobile device is not synchronized with the access point. Because of this problem, a common location technology uses the time difference of arrival (TDOA) of the signal transmitted by the mobile device at a plurality of WLSs. Each pair of WLSs produces a hyperbola of points representing the possible location of the mobile device. The intersection of the hyperbolae between at least three WLSs provides an estimate of the location of the mobile device. Thus the TDOA technique is useful when the time of transmission of the signal is not known or cannot be determined.

The present application is directed to the novel use of RRs to estimate location referred to as Multiple Range Estimation Location (MREL). Additional embodiments include adjusting the Range Rings to account for errors and mitigate multipath interference.

DETAILED DESCRIPTION

In the present disclosure, a system and method of MS location based on generating Range Rings that represent the propagation time of signals from the MS location to a set of receivers having a known location is disclosed. A functional relationship between the timing on the forward channel and the reverse channel, represented mathematically as $f(P)$ may be exploited to determine the time of transmit at the MS and this functional relationship can thus be used to determine the Range Rings. The Range Rings determined in this embodiment may potentially be degraded resulting from a common error due to any errors in estimating the time of transmit at the MS. In addition one or more of the Range Rings could be further distorted by non-line of sight (NLOS) or multipath propagation which, if not addressed, could seriously degrade the accuracy of any location estimate. This embodiment avoids differencing operations on the timing measurements since the method exploits the distinct propagation properties on each path; this also eliminates the ambiguity problems that can occur in TDOA location. The common error and the NLOS problem are jointly addressed in the present disclosure directed to a multipath mitigating method to generate location estimates that are far superior to standard TDOA location estimation.

Figure 1:
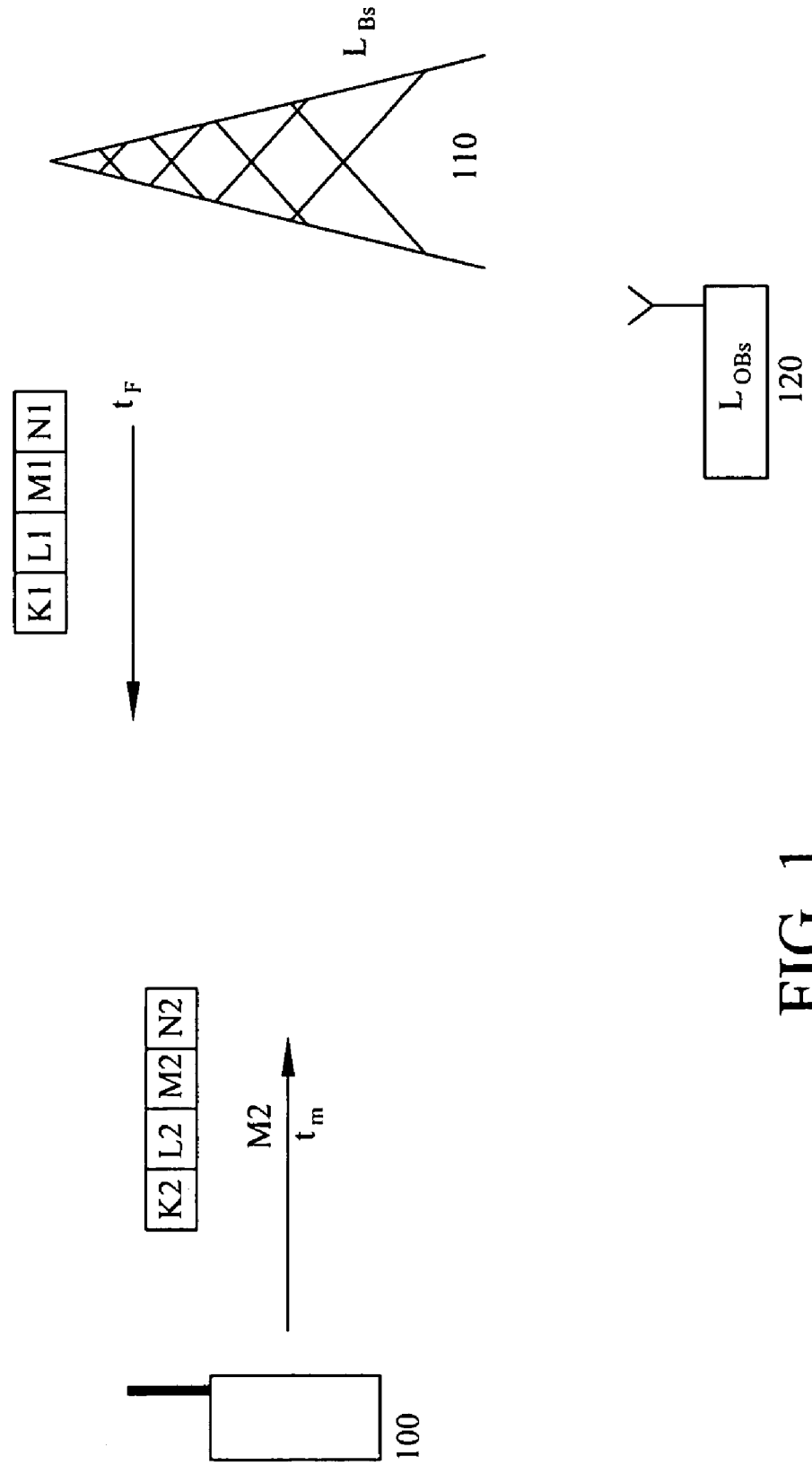
FIG. 1 is a simplified pictorial representation of one embodiment of the present disclosure

With reference to FIG. 1, the communication link between a Mobile Station (MS) 100 and a serving Base Station (BS) 110 is illustrated. A marker M1 on the downlink channel (BS to MS) and a marker M2 on the uplink channel (MS to BS) may appear in some predefined manner. For example, the markers could occur in some regular periodic fashion.

An example of such a marker could be the start of a particular frame or the start of a particular slot. A marker could also be the start or end of a particular piece or sequence of data. In one embodiment, the communication protocol may force the MS to align its marker M2 in some prescribed manner, defined by a parameter P, and communicated within the network, with respect to the receive time (at the MS) of downlink marker M1. The uplink marker M2, when viewed at the MS, is aligned such that it is separated in time with respect to the downlink marker M1 by some time interval $f(P)$. The GSM cellular protocol is an example of one such configuration. In this case, the markers of interest are the start times of corresponding slots. The parameter P is the Timing Advance (TA) parameter and the function $f(P)$ is given by $f(TA)= 3.6928*TA-3*T_s$, where $T_s$ is the symbol duration in microseconds.

In such a configuration, location of the MS can be determined with reference to FIG. 1. An observer at some location $L_{obs}$ 120 is capable of monitoring the downlink transmissions from the serving BS 110. The location of the serving BS 110 is $L_{bs}$ and the observer knows both $L_{bs}$ and $L_{obs}$. The observer 120 can then determine the exact transmission time of a marker M1 by determining when the marker M1 was observed at $L_{obs}$ and subtracting the transmission time for the signal from $L_{bs}$ to $L_{obs}$, denoted by $t_F$. A known technique may be used to derive the time estimates, where the specific technique used to obtain these estimates is well known and not described herein. If the locations $L_{obs}$ and $L_{bs}$ are coincident or very close to each other, the time of transmission of M2 from the MS to the serving BS can be computed as follows:

$$t_M = t_F + \tau_p - f(P) \qquad [1]$$

where
   $t_M$ is the transmission of a marker M2 at the MS,
   $t_F$ is the transmission time of a marker M1 at the BS,
   $\tau_p$ is the one way propagation time and may include the effects of noise and multipath,
   P is the timing parameter; and
   $f(P)$ is a function of the parameter P The time of receipt of the marker M2 at $L_{obs}$ is given by $$t_R = t_M + \tau_p \tag{2}$$

Solving for $\tau_p$ gives the propagation time from the MS to the serving BS as $$\tau_p = \frac{1}{2}(t_R - t_F + f(P)) \tag{3}$$

and gives the time of transmission at the MS as $$t_M = t_R - \frac{1}{2}(t_R - t_F + f(P)) = \frac{1}{2}(t_R + t_F - f(P)) \tag{4}$$

Thus, knowing the transmission time $t_F$, the receive time $t_R$ the parameter P and the functional relationship $f(P)$, the time of transmission of the signal M2 at the MS can be determined.

In the case of the GSM protocol $$\tau_p = \frac{1}{2}(t_R - t_F + 3.6928 * TA - 3 * T_s) \tag{5}$$

and $$t_M = \frac{1}{2}(t_R + t_F - 3.6928 * TA + 3 * T_s) \tag{6}$$

where all time measurements in this case are in microseconds.

Knowing the time of transmission of a marker M2 at the MS, Range Rings can be calculated with respect to any other observing station or WLS. For example, the time of transmission of Marker 2 can be transmitted to all observing stations. Or the time of transmission can be transmitted to a remote central site which collects the time of receipt of M2 from each of the WLSs. For each WLS, if the marker M2 was received at time $t_{R,WLS}$, then the propagation time from the MS to that WLS is $$\tau_{p,WLS} = t_{R,WLS} - t_M = t_{R,WLS} - \frac{1}{2}(t_R + t_F - f(P)) \tag{7}$$

And, given a set of WLSs, $WLS_1$, $WLS_2$, ... $WLS_n$, a set of Range Rings can be produced:

$$\tau_{p,WLSi} = t_{R,WLSi} - t_M = t_{R,WLSi} - \frac{1}{2}(t_R + t_F - f(P)),$$
$$i = 1, 2, \ldots n \tag{8}$$

Thus, a set of Range Rings R, defining the propagation times from the MS to a set of WLSs, one of which could be co-located at the serving BS, can be determined. An intersection of the Range rings provides the location of the MS. The Range Rings need not be determined at each WLS. Instead all WLSs can transmit their respective timing information to one of the WLSs, e.g., the WLS co-located at the serving BS, which performs Range Ring and location determination. Likewise, the Range Ring calculations and location determination can be made at a remote central site discussed above. A beneficial aspect of this method is that multipath on the serving link can extend the Range Rings between the WLS at the serving BS and the MS, but will not affect the computed Range Rings from the MS to other WLSs.

In one embodiment, the covariance matrix C of the Range Rings captures important statistical properties that can be used in a location technique. Given equations [5]-[7], it is possible to express all of the elements of this matrix in terms of (a) the variance of the transmission time $t_F$ given by $\sigma_F^2$, (b) the variance of the arrival time at the serving WLS $t_R$ given by $\tau_R^2$, and (c) the variance of the arrival time at non-serving WLSs, $t_{R,WLSi}$ given by $\sigma_{Ri}^2$. The calculations assume that the signals are disturbed by additive noise that is independent from sensor to sensor.

The diagonal terms of the covariance matrix C are given by the serving Range Ring variance $\frac{1}{4}\sigma_R^2 + \frac{1}{4}\sigma_F^2$ in the (1, 1) position and the individual non-serving Range Ring variances $\sigma_{Ri}^2 + \frac{1}{4}\sigma_R^2 + \frac{1}{4}\sigma_F^2$ in the (k, k) positions, where k=2, 3, ... n. The terms along the first row and column, the terms in the (1, k) and (k, 1) positions, are given by $-\frac{1}{4}\sigma_R^2 + \frac{1}{4}\sigma_F^2$. The mutual covariance terms between distinct non-serving Range Rings, the terms in the positions (k, j) where k ≠ j; k, j ≠ 1, are given by $\frac{1}{4}\sigma_F^2 + \frac{1}{4}\sigma_R^2$.

It may be observed that this defines a matrix with a lack of symmetry between the serving Range Ring and other non-serving Range Rings. This is to be expected from the form of the equations, particularly noting how the MS transmission time, $t_M$ is generated. The serving Range Ring properties are therefore dominant in this matrix.

It is important to note that the variance for each Range Ring may be different in the MREL method. That is, there may be a different variance for each individual timing measurement. In the TDOA method the calculated variance is associated with the TDOA pairs, not with the individual timing measurement, since such individual measurements are not computable in such schemes.

When clear Line Of Sight (LOS) signal paths exist between a transmitter and a set of receivers, it is expected that the multipath component in the signal propagation is quite small. In a situation where multiple instances of Range Rings can be obtained over a short time interval within which the MS cannot move an appreciable distance, the best estimate of any particular Range Ring can be obtained by some means. For example, the median Range Ring for a given MS-WLS pair may be taken as the representative Range Ring for that pair. Alternatively, the representative Range Ring may be taken by clustering the available set of Range Rings for this MS-WLS pair and using the cluster with smallest distance. In any case, the final set of Range Rings has a single Range Ring for each MS-WLS pair. Note that if two or more tight clusters occur, it is possible to provide multiple Range Rings for a given MS-WLS pair.

The set of Range Rings may be given by R where $$R = \begin{bmatrix} R_1 \\ R_2 \\ \ldots \\ R_k \end{bmatrix}, \tag{9}$$

where k is the number of geographically separated WLSs observing the MS. The WLS at the serving BS is included as a member in this set.

Let S denote the region over which the MS maybe located. This region could, for example, be the region enclosed by the set of WLSs or some expansion of this basic region. Now, for each point (x,y) in the region let $D_i(x,y)$ denote the distance from the point (x,y) to the $i^{th}$ WLS. Now let us define the vector $$D = \begin{bmatrix} D_1(x, y) \\ D_2(x, y) \\ \ldots \\ D_k(x, y) \end{bmatrix}. \tag{10}$$

Let $\alpha$ be a real number. Then assuming Gaussian noise as the disturbance on the Range Rings measurements, it can be shown that the optimum location for the MS can be written as the location $(\hat{x}, \hat{y})$ such that the quantity $$[R - A - D]^H * C^{-1} * [R - A - D] \tag{11}$$

is minimized, and in which the vector A is a vector of equal values in each position is written as, $$A = \begin{bmatrix} \alpha \\ \alpha \\ \ldots \\ \alpha \end{bmatrix} \quad [12]$$

and where the minimization is over all points (x,y) in the region S and over all real $\alpha$.

A highly simplified version of this, where we only consider the diagonal elements of the covariance matrix is considered in this disclosure. The understanding is that in actual application one should consider both the optimal solution and the simplified presentations, shown here primarily for the ease of exposition of the principles involved. With this simplification, let a be a real number. Then the optimal location for the mobile can be determined as the location $(\hat{x}, \hat{y})$ such that the vector norm given by $$\|R-A-D\| \quad [13]$$

is minimized.

An understanding of the process applied here can be obtained by considering some fundamental issues associated with LOS propagation and Range Ring accuracy. First, it is important to note that the Range Rings obtained as described in the previous section could have some uncertainty associated with them due to even a small error in estimating the transmission time at the MS. The parameter $\alpha$ is used to permit correction of this effect and also to possibly correct any error in the MSs implementation of the functional relationship $f(P)$ as well as compensating for multipath in the serving BS to MS path.

Secondly, once these measurement inaccuracies have been addressed, the remaining error on the Range Rings is assumed to be Gaussian noise for the ideal case of LOS signals. This noise is statistically limited by other quantities such as the power level of the signal, and is generally small. For example in the GSM protocol the associated error is of the order of a few tens of meters.

This minimization in equation [11] can also be expressed as $$\min \Sigma \{(R_i - \alpha - D_i)^2\} \quad [14]$$

where i indexes the particular Range Ring (or the WLS associated with that Range Ring) and the sum is over all i. In addition if each Range Ring is assigned a weight $w_i$, the minimization can be written as $$\min \Sigma \{w_i (R_i - \alpha - D_i)^2\} \quad [15]$$

An example of such a weight is the inverse of the variance of the Range Ring measurements that were used to generate that particular Range Ring. Another example may be a measure of the overall quality of the measurements that generated this Range Ring.

In addition, the range of $\alpha$ may be limited. In one case $\alpha$ is unrestricted; that is it is allowed to take any real value. In another case, $\alpha$ is limited in a manner defined by several factors including the wireless protocol being used, the type of terrain being considered, etc. In addition, one can also consider the case where $\alpha$ is limited by specifying its value to lie on a specific probability distribution.

Additional Considerations for Multipath

The present disclosure addresses the additional considerations when multipath is present by utilizing the same basic principles described above, bounded by additional constraints discussed below.

As discussed above, when clear line of sight signal paths exist between a transmitter and a set of receivers, the multipath component in the signal propagation is expected to be small. However in the majority of the situations that require location estimation, the more typical situation is that the environment is Non Line Of Sight (NLOS). This is particularly true in cities and other built-up environments. Transmitted signals arrive at a receiver along multiple paths and hence the determined propagation time is almost always in excess of the applicable LOS transmission time. In M. Silventionen and T. Rantalainen. Mobile Station Emergency Locating in GSM, *Proc. IEEE Int. Conf. Personal Wireless Communications*, Vol. 1 (1996), 232-238, the authors consider the effect of NLOS error in measurements and concludes that the errors dramatically effect accuracy of standard location algorithms. Other prior art methods of dealing with NLOS signals are considered in and discussed in P.-C. Chen. A non-line-of-sight error mitigation algorithm in location estimation, *Proc. IEEE Conf on Wireless Communications Networking*, vol. 1 (1999), 316-320, and Xin Wang, Zongxin Wang and Bob O'Dea. A TOA-based Location Algorithm Reducing the Errors due to Non-Line-Of-Sight (NLOS) Propagation, *IEEE Trans. Vehicular Technology.*, Vol. 52, no. 1 (January 2003), 112-116.

For the NLOS situation where multiple instances of Range Rings can be obtained over a short time interval, and within which the MS cannot move an appreciable distance, the best estimate of any particular Range Ring can be obtained by some means. For example, the median Range Ring for a given MS-WLS pair may be taken as the representative Range Ring for that pair. Alternatively, the representative Range Ring may be taken by clustering the available set of Range Rings for this MS-WLS pair and using the cluster with smallest distance. In any case, the final set of Range Rings has a single Range Ring for each MS-WLS pair. Note that if two or more tight clusters occur, the present disclosure can be used as follows to develop multiple Range Rings for a given MS-WLS pair.

Let this set of Range Rings be given by R where $$R = \begin{bmatrix} R_1 \\ R_2 \\ \ldots \\ R_k \end{bmatrix}, \quad [16]$$

where k is the number of geographically separated WLSs observing the MS. The WLS at the serving BS is included as a member in this set.

Let S denote the region over which the MS may be located. This region could, for example be the region enclosed by the set of WLSs or some expansion of this basic region. Now, for each point (x, y) in the region let $D_i(x, y)$ denote the distance from the point (x, y) to the ith WLS. Now let $$D = \begin{bmatrix} D_1(x, y) \\ D_2(x, y) \\ \ldots \\ D_k(x, y) \end{bmatrix}. \quad [17]$$

Let α be a real number and $\beta_i$ a set of fixed non-positive real numbers. Then the optimal location for the mobile is determined as the location (x', y') such that the vector norm given by $$\|R-A-D\| \quad [18]$$

is minimized, subject to the set of constraints that $$\{R_i-\alpha-D_i\} \geq \beta_i, \forall i, \quad [19]$$

in which the vector A is a vector of equal values in each position written as, $$A = \begin{bmatrix} \alpha \\ \alpha \\ \cdots \\ \alpha \end{bmatrix} \quad [20]$$

and where the minimization is over all points (x, y) in the region S and over all real a or where a is constrained in some manner to a range of real numbers.

Similar to the discussion above with respect to LOS, in the NLOS scenario, the Range Rings could have some uncertainty associated with them due to even a small error in estimating the transmission time at the MS. The parameter α, once again may be used to permit correction of this effect and also to possibly correct any error in the MSs implementation of the functional relationship ƒ(P) as well as compensating for multipath in the serving BS to MS path. Once these measurement inaccuracies have been addressed, the remaining error on the Range Rings is assumed to be Gaussian noise for the ideal case of LOS signals. As discussed previously, this noise is statistically limited by other quantities such as the power level of the signal, and is generally small. For example in the GSM protocol the associated error is of the order of a few tens of meters. Thus, for those Range Rings disturbed only by noise, the negative excursion on the measurement can vary from the correct value by at most a few tens of meters.

The positive excursion is unconstrained since multipath or NLOS propagation can extend the measurement, at least up to some high limit. This explains the use of the constraints applied by $\beta_i$. It follows that applying this constraint is then equivalent to biasing the final solution for the estimated location in a manner that favors location estimates where the Range Rings with NLOS components are de-emphasized. The final estimated location is thus biased in such a manner that the corrected Range Rings, $\{R_i-\alpha\}$, at any candidate solution, exhibit either the effect of Gaussian noise or a positive measurement excursion due to multipath (or NLOS signals) but no large negative excursion.

A simplified constraint may also be applied in general by using a single real non positive number β for each $\beta_i$. In such a case, the assumption is that the variation in the measurements on the signals forming the Range Rings are approximately identical. In the general case though, it is better to apply different values of $\beta_i$, which, in addition to being defined by varying power levels, can also be related to the particular WLS and its adjoining terrain. Note that it is also conceivable that there may be situations in a wireless environment where some signals are known to always have some minimal multipath such that it is statistically larger than the noise component. In such cases, it may be accurate to have some $\beta_i$ as small positive real numbers.

If a set of weights $w_i$ as used in the previous LOS section are available for use with each Range Ring, one could specify the method of location as determining $$\min \Sigma\{w_i(R_i-\alpha-D_i)^2\} \quad [21]$$

subject to the requirement that $$\{R_i-\alpha D_i\} \geq \beta_i, \forall i \quad [22]$$

In addition, like in the LOS scenario, the range of α can be limited in the multipath scenario. In one case, α is unrestricted; that is it is allowed to take any real value. In another case, it is limited in a manner defined by several factors including the wireless protocol being used, the type of terrain being considered, etc. For example, in the GSM protocol and in a rural environment α could be limited to a maximum of 500 meters.

The use of MREL to determine location of the MS is significantly different than the use of TDOA to determine location. For example, in TDOA location, there is no attempt made to determine the time of transmission from the MS. MREL on the other hand requires a determination of the MS transmit time so that it can function appropriately. In addition, because the MS transmit time is unknown in TDOA, there is no option but to subtract individual arrival times at WLSs so that the unknown MS transmit time is eliminated. For example, if the set of measured arrival times of a signal at a given set of WLSs is T, then the first operation on T is to eliminate the unknown MS transmit time by multiplying T by a differencing matrix H to generate $$T_{diff}=H*T \quad [23]$$

in which $$H = \begin{bmatrix} 1 & -1 & 0 & 0 & \cdots & 0 & 0 \\ 0 & 1 & -1 & 0 & \cdots & 0 & 0 \\ \cdots & \cdots & \cdots & \cdots & \cdots & \cdots \\ 0 & 0 & 0 & 0 & \cdots & 1 & -1 \end{bmatrix}, \quad [24]$$

is the differencing matrix that generates pair-wise difference terms. Permutations of the matrix H may also be used where each row has a single +1 term, a single −1 term and all other terms are zero. In contrast MREL has no differencing stage since the propagation time information is vital and thus requires retaining the MS's transmission time. If for example TDOA was applied to the Range Ring estimates, the first stage would have been to generate H*R. Clearly this is not the case in MREL where if this were done the MS transmission time information is lost.

Another significant difference is that if the location problem involves n WLSs, the MREL technique generates n surfaces. Each of these surfaces is a circle defined by $$\{[R_i-\alpha=D_i]\}; i=1,2,\ldots n. \quad [25]$$

TDOA location on the other hand generates n−1 surfaces $$\{T_{diff,i}=h_i\}; i=1,2,\ldots (n-1) \quad [26]$$

where each surface is a hyperbola defined by a constant h.

Figure 2:
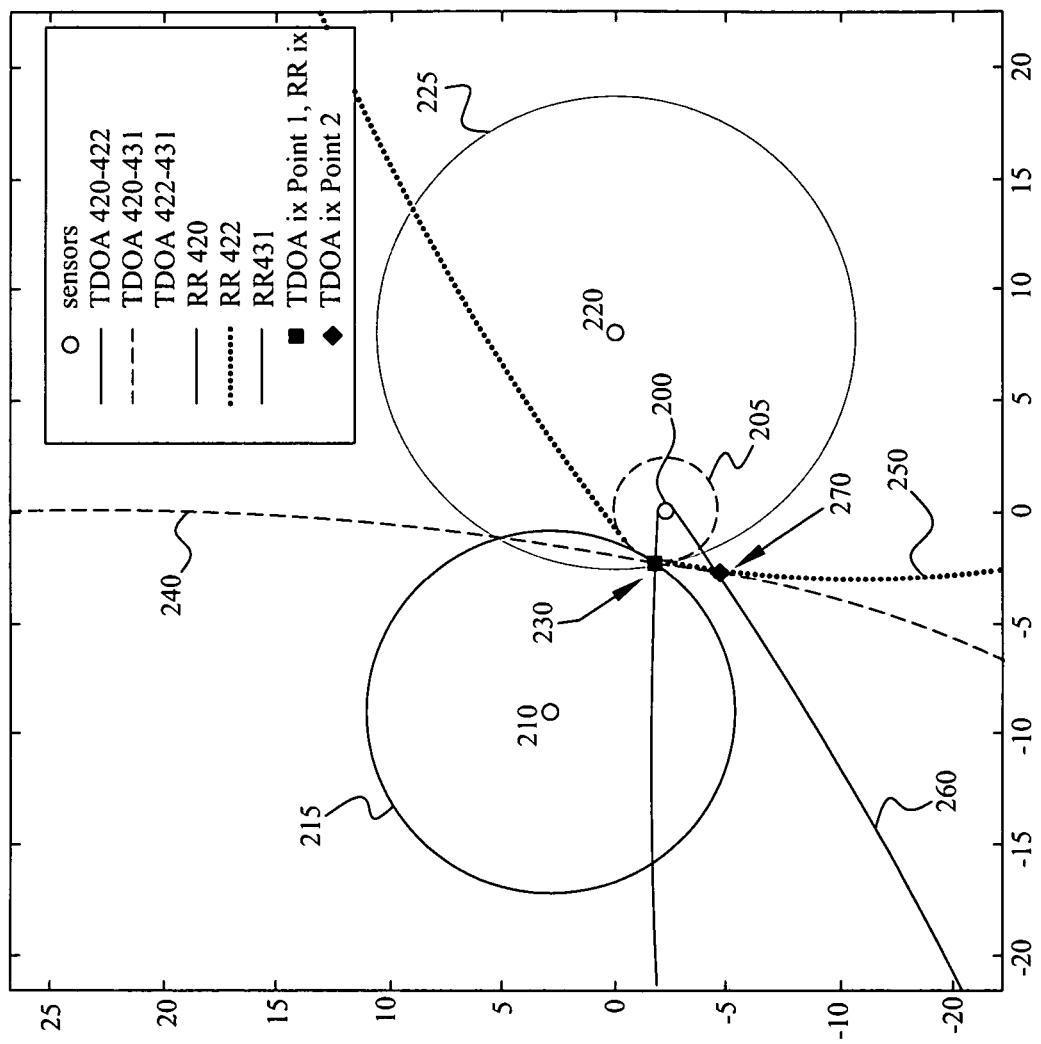
FIG. 2 is a simplified pictorial representation illustrating the differences between one embodiment of the present disclosure and the use of a time difference of arrival (TDOA) method to determine the location of a mobile transmitter.

Another difference is that the MREL surfaces being circles are much better constrained geometrically than TDOA location which uses hyperbolae (which extend to infinity at their tails). The MREL surfaces, being one more in number than the TDOA surfaces have reduced ambiguity. This can clearly be seen with reference to FIG. 2. Three WLSs 200, 210, 220 produce the three circles constituting MREL surfaces 205, 215, 225 intersect in a single point 230 which is the correct location of the MS. In contrast, the hyperbolae generated as TDOA surfaces 240, 250, 260 have two points of intersection 230 and 270. Also note that with three WLSs there are only two independent hyperbolic surfaces, whereas all three hyperbolic surfaces have been plotted to show that the intersections common to the first two independent hyperbolae are unaltered when the third dependent hyperbola is introduced. The main observation is that there is no ambiguity when MREL surfaces are used, whereas there is ambiguity (i.e. is the solution 230 or 270?) when TDOA location is applied.

Another significant difference is that the TDOA location method is weak in its ability to functionally address the problem of multipath because it starts by considering the difference of two arrival times. Once the difference of two arrival times is generated, a constraints such as applied in MREL, is inapplicable since the differenced terms show no multipath bias in either a positive or negative direction. That is, the TDOA surfaces could be equally extended in the positive or negative direction. In addition, the TDOA location scheme offers no equivalent to the limitation on the range of $\alpha$ as specified for MREL. The effect of such a limitation is to constrain the solution further by the available measurements. In a TDOA implementation such a limitation on the Range Rings would be masked by the fact that time differences of arrival times are obtained, and where such differencing effectively negates the possibility of excluding certain arrival times measurements.

Another significant difference is that if $f(P)$ is implemented differently from what is assumed, that is the MS implements either an incorrect value of P or applies $f(P)$ in some manner divergent from the expected value, then $t_M$ will be incorrect, potentially affecting all Range Rings, but doing so equally in a manner that can be mitigated using $\alpha$. On the other hand, NLOS behavior on the serving link can cause $t_M$ to be different from what it would be if the link were LOS. It will however be computed properly in that the computed value matches the actual value. In this case, if the other links from the MS to other WLSs were LOS, such Range Rings would be computed correctly. That is, the serving Range Ring will be magnified but other Range Rings will be unaffected. This should be contrasted with TDOA location where NLOS behavior on the serving link, assuming this is the link with respect to which the TDOA hyperbolas are constructed, will affect all hyperbolas.

The previous sections considered the general case of generating a representative Range Ring for each MS-WLS pair over a period of time referred to as a collect. Each such collect involves a sequence of estimates for each Range Ring, and the sequence of Range Rings is finally reduced to a representative Range Ring. The individual estimation periods are referred to as time slots. For example if $R_{ij}$ is the Range Ring associated with WLS i within time slot j, the final Range Ring $R_i$ associated with WLS i and the MS over the entire collect is given by $$R_i = g(R_{ij}), \qquad [27]$$

where g(.) is the function that reduces this set of values $R_{ij}$ to a single Range Ring $R_i$. For example g(.) could be the median of the set, the mean of the set, or in general any specified function of the set $R_{ij}$. Once a particular $R_i$ is determined for each WLS, the location determination follows as described in previous sections.

However, several other embodiments of this sequence of processing can be implemented. For example, in one embodiment, an estimated location for the MS can be determined in each slot. A final location can them be determined over all slots by suitably combining the individual estimates in some manner. For example the individual estimates can be clustered and the cluster centroid can be defined as the final location. In another embodiment, a quality measure associated with each such estimate can be used to weight and sum the individual location estimates. In yet another embodiment, a method can be used to extract the location estimates associated with smaller values of the final $\alpha$, given by $\hat{\alpha}$, and combine these estimates to produce the final location. A final low value of $\alpha$ serves as an indicator that the set of Range Rings used in this location are in agreement and also that the Range Rings themselves are good estimates. This combination of qualities makes such a selection highly likely to result in an accurate location estimate.

In another embodiment, the location estimation techniques of the previous sections can be combined to directly generate a location estimate. One method for doing so can be written as $$\min_{\underline{\alpha}, x, y} \sum_j \sum_i \{w_{ij}(R_{ij} - \alpha_j - D_{ij})^2\}, \qquad [28]$$

where $w_{ij}$ is the applied weighting on the ith Range Ring of the jth slot, and subject to the requirement that $$\{R_{ij} - \alpha_j - D_{ij}\} \geq \beta_{ij}, \forall i,j \qquad [29]$$

and where $$\underline{\alpha} = \begin{bmatrix} \alpha_1 \\ \alpha_2 \\ \ldots \\ \alpha_j \\ \ldots \\ \alpha_k \end{bmatrix}.$$

In another embodiment, any of the methods described here for using a set of Range Rings to generate a location estimate may be enhanced by examining properties of the location process. When a location estimate is generated, the set of ($\hat{\alpha}$, $\hat{x}$, $\hat{y}$) minimizes the function of interest (Eqns: 11, 13, 14, 17, 20, 23). Various measures of the estimated location ($\hat{x}$, $\hat{y}$i) can be defined:

For example, the set $$\{R_i - \hat{\alpha} - D_i\}$$

can be examined. Each element of this set is indicative of the agreement of the location estimate with the original measurements. This set, viewed as a vector is thus called a mismatch vector. If the magnitude of some of these elements is significantly larger than some of the other elements, subsets of the original set of Range Rings can be used to generate new location estimates. The first case corresponds to where there is a large mismatch. If such secondary estimates result in a smaller mismatch, such a secondary estimate with low mismatch may be used to define a revised location estimate.

By way of another example, the locations generated by all the different subsets of the original set of Range Rings can be clustered. Doing so, it can be determined which subset of Range Rings define the best cluster. This best cluster can be defined by various measures such as the tightness of the cluster, the number of members, a function of the Circular Error Probable (CEP) for the locations in the cluster, a function of the values of $\hat{\alpha}$ for the locations in the cluster, etc. Once the appropriate cluster is selected, the centroid of this cluster can be defined as the final estimated location.

In one embodiment, a method for improving the transmission time estimate can be used. The estimation of the transmission time, $t_F$ at the serving BS can be obtained by observing the transmitted signal at a single observer location $L_{obs}$ as described previously. Often, $L_{obs}$ is co-located at the serving BS location. However, even if it is not, provided the distance between $L_{obs}$ and the serving BS is known, $t_F$ can be estimated as the time at which a marker on the downlink is observed at $L_{obs}$ and subtracting the propagation time required for the signal to traverse the distance from the serving BS to $L_{obs}$.

Because this estimate can be corrupted by multipath or NLOS behavior of the path between the serving BS and $L_{obs}$, the present disclosure can attempt to mitigate the corruption caused by the multipath. One method of achieving this is to observe the downlink at more than one WLS. If the downlink is observed at $WLS_1, WLS_2, \ldots, WLS_m$, the known (computed since the distances are known) propagation times from the serving BS to each of these WLSs is $t_{p1}, t_{p2}, \ldots, t_{pm}$ and the observed times at which the marker is observed on the downlink at each of these WLSs be $t_{O1}, t_{O2}, \ldots, t_{Om}$. Then the actual transmission time, as observed by these observers is given by the vector $$t_F = \begin{bmatrix} t_{O1} - t_{p1} \\ t_{O2} - t_{p2} \\ \ldots \\ t_{Om} - t_{pm} \end{bmatrix}. \quad [30]$$

A final estimate of the transmission time $t_F$ can be obtained as a function of the vector $t_F$. One possibility is to use the mean of the vector. Another method would be to use the median. Since multipath can only extend the propagation times, another option would be to set $t_F$ as the minimum of the vector, provided that all measurements in the vector have high quality.

It was previously described how the MREL method could be implemented in a GSM protocol. However, the disclosure is equally applicable to other protocols as well. For example, the generation of Range Rings for the Universal Mobile Telecommunication System (UMTS) fits the general framework described above. The relevant marker M1 in this case can be taken as the Downlink Dedicated Physical Channel (F-DPCH) frame marker and the marker M2 can be taken as the Uplink Dedicated Physical Channel (DPCH) frame marker. P is the Timing Window Parameter. With this interpretation, the function $f(P)$ is given by $$f(P) = -(1024+P)*T_c \quad [31]$$

where
P is the Timing Window Parameter in the range [0-148] and $T_c$ is 26.042 microseconds.

The value of $f(P)$ referred to in the standards as the UE Rx–Tx time difference is reported by the MS. Unlike the case of GSM, where the TA parameter is transmitted by the BS with the understanding that the Mobile should implement the corresponding $f(P)$, in the case of UMTS the MS's objective is to always aim for a value of P=0 and thus $f(P)=-1024$. This is not readily achieved at all times, such as during a handover, where the MS is adjusting from one serving BS to another. The actual $f(P)$, where P is non-zero, is thus reported back to the BS. With the knowledge of $f(P)$, the calculation of the Range Rings can proceed as described above.

In the WiMAX wireless protocol, the MS reports the Round Trip Delay ($T_{RTD}$) and the Relative Delay ($T_{RD}$) where the first parameter is with respect to the anchor BS, and the second is with respect to other neighboring BSs. Let the values of Relative Delay with respect to neighbor BSs 2, 3, ... k be given by $T_{RDj}$. Then the Range Ring with respect to the anchor BS can be written as $R1=0.5*T_{RTD}$ while the Range Ring with respect to neighbor BS j can be written as $$R_j = T_{RDj} + R_1; \{j=2,3,\ldots k\} \quad [32]$$

With the Range Rings determined in this manner the methods for determining location as described above can be applied.

In the case of the CDMA protocol, the downlink transmissions are synchronous to Global Positioning System (GPS) time. Additionally, this time reference is conveyed to the MS via the downlink of the serving BS. The Mobile time reference is thus a delayed version of the BS time reference with this delay being exactly the propagation delay from the BS to the MS. When the MS transmits, it uses its own delayed time reference to adjust the Pseudo-Noise (PN) code phases. A WLS collocated with the serving BS can thus determine the BS-MS propagation time $R_1$ as one half of the overall time difference between the downlink PN code phase and the received uplink PN code phase. This is then the applicable Range Ring for the Mobile Serving BS path. Additionally, WLSs located elsewhere can observe the uplink PN code phase. If $WLS_j$ receives this uplink code phase at time $t_j$, and the WLS at the serving BS observes the Downlink code phase at time $t_F$, then one can write the Range Ring $R_j$ as $$R_j = t_j - t_F - R_1; \{j=2,3,\ldots k\} \quad [33]$$

With the Range Rings determined in this manner the methods for determining location as described above can be applied.

It may be emphasized that the above-described embodiments, particularly any "preferred" embodiments, are merely possible examples of implementations, merely set forth for a clear understanding of the principles of the disclosure. Many variations and modifications may be made to the above-described embodiments of the disclosure without departing substantially from the spirit and principles of the disclosure. All such modifications and variations are intended to be included herein within the scope of this disclosure and the present disclosure and protected by the following claims Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine-generated electrical, optical, or electromagnetic signal that is generated to encode information for transmission to suitable receiver apparatus for execution by a computer. The computer readable medium can be a machine-readable storage device, a machine-readable storage substrate, a memory device, a composition of matter affecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although a few embodiments have been described in detail above, other modifications are possible. Other embodiments may be within the scope of the following claims.

What is claimed:

1. A method of estimating the geographic location of a mobile device, wherein the mobile device communicates with a base station using a communication protocol, comprising the steps of:
    (a) observing at a first reference station, the time of transmission of a first signal from a base station to a mobile device;
    (b) receiving at the first reference station, a timing parameter transmitted in the first signal;
    (c) receiving at the first reference station, a second signal transmitted by the mobile device;
    (d) determining the range of the mobile to the first reference station as a function of the received first signal, the timing parameter and the received second signal.

2. The method of claim 1 wherein the step of determining the range includes determining the time of transmission of the second signal at the mobile device.

3. The method of claim 1 further comprising the steps:
(e) receiving the second signal at a plurality of reference stations;
(f) determining the range of the mobile device to the plurality of reference stations as a function of the time of transmission of the second signal and the time of receipt of the second signal at each of the plurality of reference stations; and
(g) determining the geographic location of the mobile device as a function of the determined ranges to the plurality of reference stations.

4. The method of claim 3 wherein the step of determining the range of the mobile device to the plurality of reference stations is performed at one of the plurality of reference stations.

5. The method of claim 4 wherein the step of determining the range of the mobile device to the plurality of reference stations is performed at the first reference station.

6. The method of claim 3 wherein the step of determining the range of the mobile device to the plurality of reference stations is performed at a centralized site remote to the plurality of reference stations.

7. The method of claim 1 wherein the bases station and the mobile device are synchronized.

8. The method of claim 1 wherein the first reference station is co-located with the base station serving the mobile device.

9. The method of claim 1 wherein the first reference station is a receiver at a known location.

10. The method of claim 3 wherein the step of determining the geographic location of the mobile includes adjusting each of the determined ranges to determine the geographic location of the mobile device.

11. The method of claim 2 wherein the mobile device uses the timing parameter transmitted in the first signal to determine a time of transmission of the second signal.

12. The method of claim 1 wherein the timing parameter is timing advance (TA).

13. The method of claim 12 wherein the communication protocol used by the mobile device and the base station is GSM.

14. The method of claim 10 wherein the step of adjusting includes adjusting each of the range rings approximately the same amount.

15. The method of claim 14 wherein each of the range rings is adjusted iteratively.

16. The method of claim 10 wherein the step of adjusting includes adjusting each of the range rings as a function of the presence of multipath.

17. The method of claim 10 wherein the step of adjusting is achieved by minimizing the quantity [R−A−D]H*C−1*[R−A−D];
wherein,
R is the set of range rings for each of the plurality of reference stations to the mobile device,
D is set of distances for each possible location of the mobile device to the plurality of reference stations,
A is a vector of equal values of $\alpha$ for each possible location, and
C is the covariance matrix for the set of Range Rings.

18. The method of claim 1 wherein the time of transmission of the first signal is determined as a function of the time at which a marker on the downlink is observed and the propagation time for the first signal to traverse the distance from the base station to the first reference station.

19. A method of estimating the geographic location of a mobile device, wherein the mobile device communicates with a base station using a communication protocol, comprising the steps of
(a) observing at a first reference station, the time of transmission of a first signal from a base station to a mobile device;
(b) receiving at the first reference station, a timing parameter;
(c) receiving at the first reference station, a second signal transmitted by the mobile device;
(d) determining the time of transmission of the second signal at the mobile device;
(e) transmitting the determined time of transmission of the second signal from the first reference station to a plurality reference stations;
(f) receiving at the plurality of reference stations the second signal;
(g) determining the range of the mobile device to the plurality of reference stations as a function of the time of transmission of the second signal and the time of receipt of the second signal; and
(h) determining the geographic location of the mobile device as a function of the determined ranges to the plurality reference stations.

20. The method of claim 19 wherein the time of transmission of the first signal is determined form the time of transmission of a marker in the first signal.

21. The method of claim 19 wherein the step of determining the time of transmission of the second signal is given by the equation $$tM=\tfrac{1}{2}(tR+tF-f(P))$$

where tM is time of transmission of a marker of the second signal;
tR is time of arrival of the marker of the second signal at the first reference station;
tF is the time of transmission of the first signal;
P is a timing parameter; and
f(P) is a function of the timing parameter.

22. The method of claim 19 wherein the timing parameter is timing advance (TA), the communication protocol is GSM and f(P)=3.6928×TA.

23. The method of claim 19 wherein the timing parameter is the position of physical channel frame makers, the communication protocol is UMTS and f(P)=−(1024+P)×26.042 wherein P is in the range 0-148.

24. The method of claim 19, wherein the range between the each of the plurality of reference stations and the mobile device is given by the equation $$\tau pi=tRi-\tfrac{1}{2}(tR-tF+f(P))$$

where τpi=is the distance between the mobile device and the ith reference station;
tRi is the time of receipt of the second signal at the ith reference station;
tR is the time of receipt of the second signal at the first reference station;
tF is the time of transmission of the first signal;
P is a timing parameter; and
f(P) is a function of the timing parameter.

25. The method of claim 19 wherein the first reference station is co-located with the base station.

26. The method of claim 19 wherein the first reference station is the serving base station for the mobile.

27. A system for estimating the geographic location of a mobile device, wherein the mobile device communicates with a base station using a communication protocol, comprising:
- a first monitoring unit at a known location for receiving transmissions from the mobile device and the base station, having a processor programmed:
  - (i) to determine the time of transmission of a first signal from a base station to a mobile device;
  - (ii) to identify a timing parameter transmitted in the first signal;
  - (iii) to determine the time of receipt of a second signal transmitted from the mobile device; and
  - (iv) to determine the range of the mobile device to the first monitoring unit as a function of the received first signal, the timing parameter and the received second signal.

28. The system of claim 27, further comprising;
- a second and third monitoring unit of known location, each having a processor programmed to determine the time of receipt of the second signal, and to determine the range of the mobile device to the respective monitoring unit, wherein the first monitoring unit communicates the timing parameter to the second and third monitoring units; and
- a locating processor programmed to determine the estimated location of the mobile as a function of the determined ranges.

29. The system of claim 28 wherein the first, second and third monitoring units are co-located at separate base stations.

30. The system of claim 29 wherein the locating processor is co-located with one of the monitoring units.

31. A computer program product for estimating the geographic location of a mobile device, wherein the mobile device communicates with a base station using a communication protocol, said computer program product comprising:
- a non-transitory computer usable medium having computer readable program code modules embodied in said medium for estimating the geolocation of the mobile device;
- computer readable first program code module for causing a processor to determine the time of transmission of a first signal from a base station to a mobile device;
- computer readable second program code module for causing a processor to identify a timing parameter transmitted in the first signal;
- computer readable third program code module for causing a processor to determine the time of receipt of a second signal transmitted from the mobile device; and
- computer readable fourth program code module for causing a processor to determine the range of the mobile device to the first monitoring unit as a function of the received first signal, the timing parameter and the received second signal.

32. The computer program of claim 31 further comprising computer readable fifth program code module for causing a processor to receive a determined range to the mobile device from a plurality of computer readable fourth program code modules and for causing said processor to determine the estimated location of the mobile as a function of the determined ranges.

33. The computer program of claim 32 wherein first, second, third and fourth program code modules control a first processor and the fifth program module controls a second processor distributed from the first processor.

34. The computer program of claim 33 wherein the first processor is co-located at as base station.

* * * * *